Figure 1:
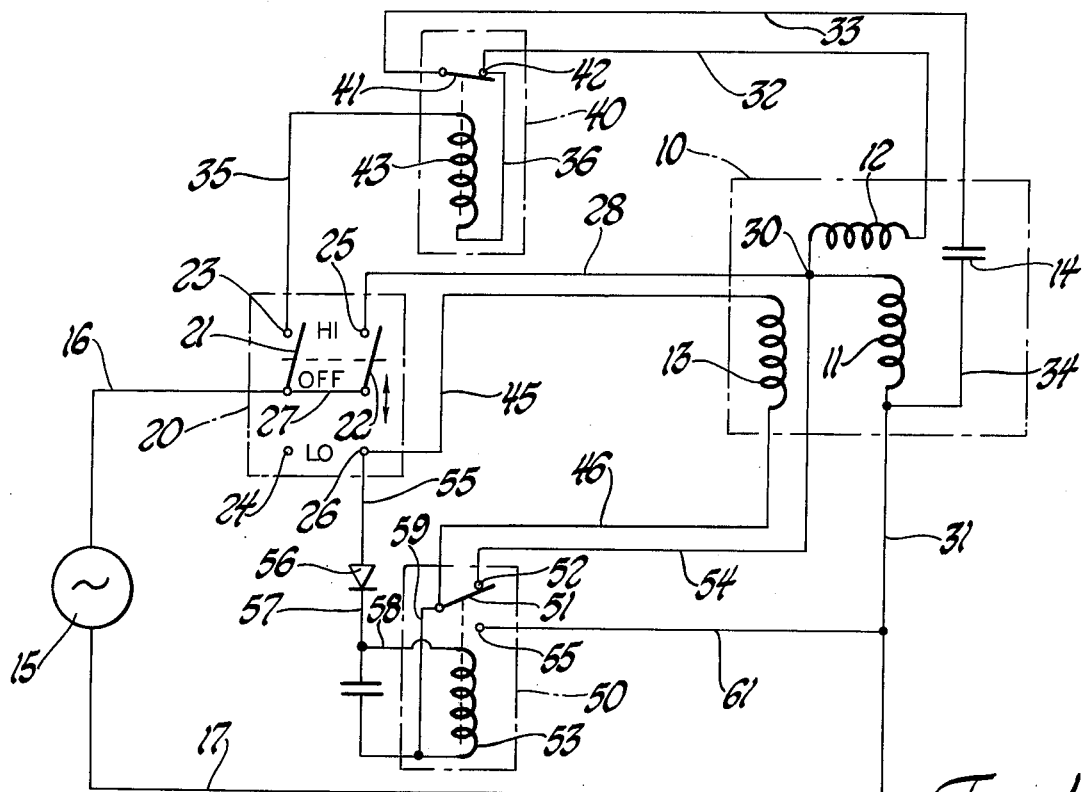

United States Patent [19]

Halsted

[11] 4,030,009
[45] June 14, 1977

[54] SINGLE PHASE ALTERNATING CURRENT MOTOR DUAL SPEED CONTROL CIRCUIT

[75] Inventor: Edwin Howe Halsted, Dayton, Ohio

[73] Assignee: General Motors Corporation, Detroit, Mich.

[22] Filed: Jan. 9, 1976

[21] Appl. No.: 648,044

[52] U.S. Cl. .................. 318/221 R; 318/224 A; 318/225 R
[51] Int. Cl.² .................................. H02P 1/44
[58] Field of Search ....... 318/220 R, 221 R, 221 G, 318/224 A, 225 R

[56] References Cited

UNITED STATES PATENTS

| | | | |
|---|---|---|---|
| 2,743,406 | 4/1956 | London | 318/224 A X |
| 2,774,024 | 12/1956 | Brammerlo | 318/224 A |
| 3,049,654 | 8/1962 | Brucken | 318/225 R X |
| 3,110,852 | 11/1963 | Brucken et al. | 318/224 A X |
| 3,389,316 | 6/1968 | Roby | 318/225 R X |

Primary Examiner—Gene Z. Rubinson
Attorney, Agent, or Firm—Richard G. Stahr

[57] ABSTRACT

A double pole-double throw dual speed control switch for a single phase AC motor having high speed main and starting windings and a low speed main winding is operable to a high speed operating mode position in which the high speed starting and running circuit including the high speed main and starting windings in parallel is completed and to a low speed operating mode position in which the low speed starting circuit including the low speed main winding and the parallel combination of the high speed main and starting windings in series is completed. A potential sensitive switching device responsive to a potential of a predetermined magnitude across the low speed main winding is effective to interrupt the low speed operating mode starting circuit and to establish a low speed motor running circuit for the low speed main winding.

4 Claims, 2 Drawing Figures

U.S. Patent  June 14, 1977  4,030,009

SINGLE PHASE ALTERNATING CURRENT MOTOR DUAL SPEED CONTROL CIRCUIT

This invention is directed to a single phase alternating current motor dual speed control circuit and, more specifically, to a circuit of this type for use with a single phase alternating current motor having high speed main and starting windings and a low speed main winding.

To provide dual speed operation of single phase alternating current motors, one form prior art uses a motor having separate high and low speed starting and running windings in combination with a complex switching arrangement arranged to switch the high speed starting and running windings across the line or the low speed starting and running windings across the line, as desired. In addition to the additional copper and the complex switching arrangement used in some prior art systems, these systems have the additional disadvantage of producing high mechanical stress upon the motor in the event of a rapid switch from the high speed operating mode to the low speed operating mode before the motor rotor has slowed to substantially the synchronous speed of the low speed running mode. Therefore, a single phase alternating motor dual speed control circuit which obviates the disadvantage of the prior art by providing a simple switching arrangement through which an alternating current single phase motor may be selectively operated at either of two speed operating modes and may be switched from the high speed operating mode to the low speed operating mode with a minimum of delay and mechanical stress upon the motor, is desirable.

It is, therefore, an object of this invention to provide an improved single phase alternating current motor dual speed control circuit.

It is another object of this invention to provide an improved single phase alternating current motor dual speed control circuit for use with a single phase alternating current motor having high speed main and starting windings and a low speed main winding.

It is a further object of this invention to provide an improved single phase alternating current dual speed control circuit which provides for the switching from a high speed operating mode to a low speed operating mode with a minimum of motor mechanical stress.

In accordance with this invention, a single phase alternating current motor dual speed control circuit for use with a single phase alternating current motor having high speed main and starting windings and a low speed main winding is provided wherein the low speed operating mode starting circuit including the low speed main winding and the parallel combination of the high speed main and starting windings in series may be connected across the supply line for initiating low speed operating mode operation from either rest or high speed and a potential sensitive electrical switching device responsive to a potential of a predetermined magnitude across the low speed main winding interrupts the low speed operating mode starting circuit and establishes a low speed operating mode running circuit.

Figure 2:
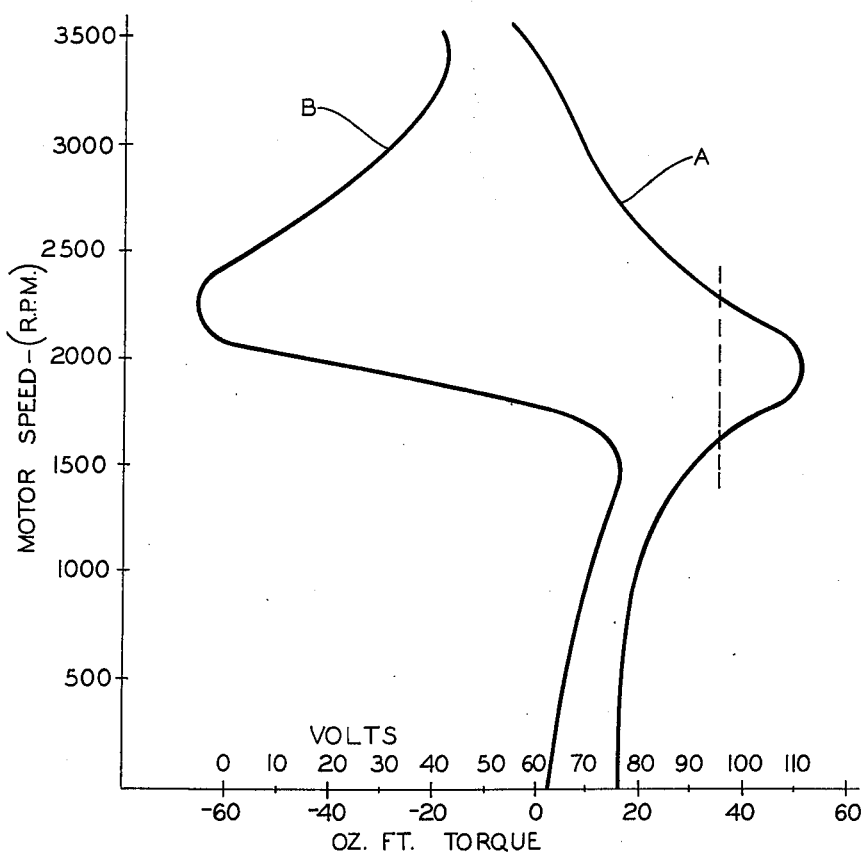

For a better understanding of the present invention, together with additional objects, advantages and features thereof, reference is made to the following description and accompanying drawings in which:

FIG. 1 sets forth the single phase alternating current motor dual speed control circuit of this invention in schematic form, and FIG. 2 is a set of curves useful in understanding the operation of the circuit of FIG. 1.

Referring to the drawing, the single phase alternating current motor dual speed control circuit of this invention is set forth in combination with a single phase alternating current motor 10 having high speed main and starting windings 11 and 12, a low speed main winding 13 and a starting capacitor 14. Motor 10 may be operated from any alternating current power source 15 of a potential rating compatible with the rating of motor 10. The potential of alternating current power source 15 may be supplied through supply lines 16 and 17.

Selector switch 20 having two movable contacts 21 and 22 and stationary contact pairs 23-24 and 25-26 corresponding, respectively, to movable contacts 21 and 22 functions as both a main power disconnect switch and a speed selector switch. Movable contacts 21 and 22 may be operated to an "off" position as indicated in the drawing, to a "high speed" position in which movable contacts 21 and 22 are in electrical circuit contact with respective corresponding stationary contacts 23 and 25 and to a "low speed" position in which movable contacts 21 and 22 are in electrical circuit contact with respective corresponding stationary contacts 24 and 26. Selector switch 20 may be any of the conventional commercially available double pole-double throw electrical switches well known in the art.

Upon the closure of movable contacts 21 and 22 of selector switch 20 to the "high speed" position in which movable contacts 21 and 22 are in electrical circuit contact with respective corresponding stationary contacts 23 and 25, an electrically energizable high speed operating mode motor starting and running circuit including high speed main winding 11 and starting winding 12 in parallel is established. This circuit may be traced from the alternating current power source 15 through lead 16, lead 27 between movable contacts 21 and 22 of selector switch 20, movable contact 22 and stationary contact 25 and lead 28 to junction 30. At junction 30, this circuit divides into two parallel branches, one of which may be traced through high speed main or running winding 11 and leads 31 and 17 to the other side of alternating current power source 15 and the other of which may be traced through high speed starting winding 12, lead 32, the normally closed movable-stationary contact pair 41-42 of relay 40, lead 33, starting capacitor 14 and leads 34, 31 and 17 to the opposite side of alternating current power source 15. Operating coil 43 of relay 40 is connected across high speed starting winding 12 through lead 28, movable-stationary contact pair 22-25, lead 27 and movable-stationary contact pair 21-23 of selector switch 20 and lead 35 and through leads 32 and 36. Upon the closure of selector switch 20 to the "high speed" position, therefore, motor 10 starts and accelerates in speed toward the synchronous speed as determined by the number of magnetic poles generated by high speed main or running winding 11. Initially, the potential drop across high speed starting winding 12 is low because of the low impedance of motor 10 and increases in magnitude as the speed of motor 10 increases. When motor 10 has reached a predetermined speed at which the potential drop across high speed starting winding 12 is of a magnitude great enough to supply sufficient energizing current to operating coil 43 of relay 40 to operate movable contact 41 out of electrical circuit engagement with stationary contact 42, relay 40 electrically disconnects high speed starting winding 12. At this time, motor 10 operates on the high speed main or running winding 11 only at nearly the synchronous speed determined by the number of magnetic poles generated by high speed main or running winding 11 in a manner well known in the motor art.

It has been found that when selector switch 20 is operated to the "low speed" position, the potential drop across low speed main or running winding 13 is low when the motor is operating at both the no speed or initial start mode and at the synchronous running speed determined by the number of magnetic poles generated by the high speed running winding 11 and increases in magnitude as the motor accelerates in speed from the initial start mode and as the motor decelerates from a super synchronous speed running mode toward the synchronous speed as determined by the number of magnetic poles generated by low speed running winding 13. In a practical application of the circuit of this invention, a single phase alternating current motor having a two-pole high speed running winding and a four-pole low speed running winding was supplied power from a 115 volt single phase alternating current source. When selector switch 20 is in the "low speed" position, the measured potential drop across the low speed running winding 13 was of the order of 75 volts at zero speed and of the order of 55 volts at the two-pole super synchronous speed of 3580 RPM, relative to the four-pole synchronous speed. As the motor accelerated in speed from zero, the potential drop across the low speed main winding increased from approximately 75 volts to approximately 104 volts at the four-pole no load operating speed of 1780 RPM. As the motor decelerated from the two-pole super synchronous speed of 3580 RPM toward the four-pole no load operating speed of 1780 RPM, the potential drop across the low speed running winding increased from approximately 55 volts to a maximum of approximately 114 volts at 1980 RPM and then decreased to approximately 104 volts at the four-pole no load operating speed of 1780 RPM. A plot of the potential drop across the low speed running winding through the range of 0 to 3580 RPM motor speed is set forth in curve A of FIG. 2.

Upon the operation of selector switch 20 to the "low speed" position in which movable contacts 21 and 22 are in electrical circuit contact with respective corresponding stationary contacts 24 and 26, a selectively energizable low speed operating mode motor starting circuit including low speed main or running winding 13 and the parallel combination of high speed main or running winding 11 and high speed starting winding 12 is established. This circuit may be traced from alternating current power source 15, through lead 16, lead 27 between movable contacts 21 and 22 of selector switch 20, movable contact 22 and stationary contact 26, lead 45, low speed main or running winding 13, lead 46, normally closed movable-stationary contact pair 51–52 of relay 50 and lead 54 to junction 30. At junction 30, this circuit divides into two parallel branches, one of which may be traced through high speed main or running winding 11 and leads 31 and 17 to the other side of alternating current power source 15 and the other of which may be traced through high speed starting winding 12, lead 32, the normally closed movable-stationary contact pair 41–42 of relay 40, lead 33, starting capacitor 14 and leads 34, 31 and 17 to the other side of the alternating current power source 15. Operating coil 53 of relay 50 is connected in parallel across low speed main or running winding 13 through leads 58 and 57, diode 56, lead 55, stationary contact 26 of selector switch 20 and lead 45 and through leads 59 and 46. Upon the closure of selector switch 20 to the "low speed" position, therefore, motor 10 starts and accelerates in speed. Initially, the potential drop across low speed main or running winding 13 is low and increases in magnitude as the speed of motor 10 increases. When motor 10 has reached an acceleration predetermined speed at which the potential drop across low speed main or running winding 13 is of a predetermined magnitude great enough to supply sufficient energizing current to operating coil 53 of relay 50 to operate movable contact 51 out of engagement with stationary contact 52 and into engagement with stationary contact 55, relay 50 interrupts the low speed operating mode starting circuit and establishes the low speed operating mode running circuit for low speed main or running winding 13. This circuit may be traced from alternating current power source 15, through leads 16 and 27, movable contact 22 and stationary contact 26 of selector switch 20, lead 45, low speed main or running winding 13, lead 46, movable-stationary contact pair 51–55 of relay 50 and leads 61 and 17 to the other side of alternating current power source 15. In the practical application of the circuit of this invention hereinbefore referred to, the relay corresponding to relay 50 had an operating coil which required 95 volts to operate the movable contact thereof. Therefore, relay 50 switched to interrupt the low speed operating mode starting circuit and established the low speed operating mode running circuit at a motor speed of approximately 1625 RPM, the accelerating speeds at which the potential drop across low speed main winding 13 increased to 95 volts.

Should motor 10 be operating in the high speed mode and selector switch 20 be switched to the "low speed" position, the energizing circuit, previously described, for operating coil 43 of relay 40 is interrupted, consequently, the normally closed movable-stationary contact pair 41–42 thereof operates to the electrical circuit closed condition. At this time, the low speed operating mode motor starting circuit previously described is established and a closed loop is established for circulating current produced by potential induced in high speed starting winding 12 which may be traced from junction 30, through high speed main or running winding 11, lead 34, starting capacitor 14, lead 33, the now closed movable-stationary contact pair 41–42 of relay 40 and lead 32 to the opposite side of high speed starting winding 12. This circulating current produces a braking torque, curve B of FIG. 2, which rapidly reduces the speed of motor 10 toward the synchronous speed determined by low speed main or running winding 13. When motor 10 has reached a deceleration predetermined speed at which the potential drop across low speed main or running winding 13 is of a predetermined magnitude great enough to supply sufficient energizing current to operating coil 53 of relay 50 to operate movable contact 51 thereof out of engagement with stationary contact 52 and into engagement with stationary contact 55, 95 volts at approximately 2275 RPM in the aforementioned practical application, relay 50 interrupts the low speed operating mode motor starting circuit and establishes the low speed mode motor running circuit previously described for low speed main winding 13. At this time, motor 10 operates near the synchronous speed determined by low speed main winding 13.

While a preferred embodiment of the present invention has been shown and described, it will be obvious to those skilled in the art that various modifications and substitutions may be made without departing from the spirit of the invention which is to be limited only within the scope of the appended claims.

The embodiments of the invention in which an exclusive property or privilege is calimed are defined as follows:

1. A single phase alternating current motor dual speed control circuit for use with a single phase alternating current motor having high speed main and starting windings and a low speed main winding comprising:
    a selectively energizable energizing circuit for said high speed main and starting windings;
    a selectively energizable first energizing circuit for said low speed main winding including said low speed main winding and the parallel combination of said high speed main and starting windings in series; and
    a potential sensitive switching device responsive to a potential drop of a predetermined magnitude across said low speed main winding for interrupting said first energizing circuit for said low speed main winding and for establishing a second energizing circuit for only said low speed main winding.

2. A single phase alternating current motor dual speed control circuit for use with a single phase alternating current motor having high speed main and starting windings and a low speed main winding comprising:
    a selectively energizable energizing circuit for said high speed main and starting windings;
    a selectively energizable first energizing circuit for said low speed main winding including said low speed main winding and the parallel combination of said high speed main and starting windings in series; and
    an electrical relay having an operating coil and normally closed and normally open contact pairs, said operating coil being connected across said low speed main winding; said normally closed contact pair being included in said selectively energizable first energizing circuit for said low speed main winding and located between said low speed main winding and the parallel combination of said high speed main and starting windings and said normally open contact pair being effective to establish a low speed mode motor running circuit for said low speed main winding.

3. A single phase alternating current motor dual speed control circuit for use with a single phase alternating current motor having high speed main and starting windings and a low speed main winding comprising:
    a selectively energizable high speed operating mode motor starting and running circuit including said high speed main and starting windings in parallel;
    electrical switch means effective to electrically disconnect said high speed starting winding when said motor has reached a predetermined speed;
    a selectively energizable low speed operating mode motor starting circuit including said low speed main winding and the parallel combination of said high speed main and starting windings in series; and
    a potential sensitive electrical switching device responsive to a potential of a predetermined magnitude across said low speed main winding for interrupting said low speed operating mode motor starting circuit and for establishing a low speed mode motor running circuit for said low speed main winding.

4. A single phase alternating current motor dual speed control circuit for use with a single phase alternating current motor having high speed main and starting windings and a low speed main winding comprising:
    a selectively energizable high speed operating mode motor starting and running circuit including said high speed main and starting windings in parallel;
    electrical switch means effective to electrically disconnect said high speed starting winding when said motor has reached a predetermined speed;
    a selectively energizable low speed operating mode motor starting circuit including said low speed main winding and the parallel combination of said high speed main and starting windings in series; and
    an electrical relay having an operating coil and normally closed and normally open contact pairs, said operating coil being connected across said low speed main winding; said normally closed contact pair being included in said low speed operating mode motor starting circuit and located between said low speed main winding and the parallel combination of said high speed main and starting windings and said normally open contact pair being effective to establish a low speed mode motor running circuit for said low speed main winding.

* * * * *